US012666040B2

(12) United States Patent
Zhernov et al.

(10) Patent No.: US 12,666,040 B2
(45) Date of Patent: Jun. 23, 2026

(54) TRAINING RATE CONTROL NEURAL NETWORKS THROUGH REINFORCEMENT LEARNING

(71) Applicant: GDM Holding LLC, Mountain View, CA (US)

(72) Inventors: Anton Zhernov, London (GB); Chenjie Gu, Sunnyvale, CA (US); Daniel J. Mankowitz, St. Albans (GB); Julian Schrittwieser, London (GB); Amol Balkishan Mandhane, London (GB); Mary Elizabeth Rauh, London (GB); Miaosen Wang, Sunnyvale, CA (US); Thomas Keisuke Hubert, London (GB)

(73) Assignee: GDM Holding LLC, Mountain View, CA (US)

( * ) Notice: Subject to any disclaimer, the term of this patent is extended or adjusted under 35 U.S.C. 154(b) by 158 days.

(21) Appl. No.: 18/565,008

(22) PCT Filed: May 30, 2022

(86) PCT No.: PCT/EP2022/064566
§ 371 (c)(1),
(2) Date: Nov. 28, 2023

(87) PCT Pub. No.: WO2022/248736
PCT Pub. Date: Dec. 1, 2022

(65) Prior Publication Data
US 2024/0267532 A1    Aug. 8, 2024

Related U.S. Application Data

(60) Provisional application No. 63/194,940, filed on May 28, 2021.

(51) Int. Cl.
*H04N 19/149* (2014.01)
*H04N 19/172* (2014.01)

(52) U.S. Cl.
CPC ......... *H04N 19/149* (2014.11); *H04N 19/172* (2014.11)

(58) Field of Classification Search
CPC .................................................... H04N 19/00
See application file for complete search history.

(56) References Cited

U.S. PATENT DOCUMENTS

2019/0132591 A1    5/2019  Zhang et al.
2019/0335192 A1*  10/2019  Otto ...................... G06N 20/10
(Continued)

FOREIGN PATENT DOCUMENTS

CN        110351555 A      10/2019
CN        111294595 A       6/2020
(Continued)

OTHER PUBLICATIONS

Achiam et al., "Constrained policy optimization," CoRR, May 28, 2018, arxiv.org/abs/1805.11074, 15 pages.
(Continued)

*Primary Examiner* — Kyle M Lotfi

(74) *Attorney, Agent, or Firm* — Fish & Richardson P.C.

(57) ABSTRACT

Systems and methods for training rate control neural networks through reinforcement learning. During training, reward values for training examples are generated from the current performance of the rate control neural network in encoding the video in the training example and the historical performance of the rate control neural network in encoding the video in the training example.

18 Claims, 9 Drawing Sheets

(56) References Cited

U.S. PATENT DOCUMENTS

2020/0344472 A1    10/2020  Peng et al.
2024/0161488 A1*    5/2024  Solovyev ............. H04N 19/147

FOREIGN PATENT DOCUMENTS

| CN | 112399176 | 2/2021 |
|---|---|---|
| JP | 2019512938 | 5/2019 |
| KR | 20030009575 A | 2/2003 |
| KR | 100790900 | 1/2008 |

OTHER PUBLICATIONS

Ba et al., "Layer normalization," CoRR, Jul. 21, 2016, arXiv: 1607.06450, 14 pages.
Bohez et al., "Value constrained model-free continuous control," CoRR, Feb. 12, 2019, arXiv:1902.04623, 12 pages.
Calian et al., "Balancing constraints and rewards with meta-gradient D4PG," CoRR, Oct. 13, arxiv.org/abs/2010.06324, 22 pages.
Chiang et al., "A new rate control scheme using quadratic rate distortion model," Proceedings of 3rd IEEE International Conference on Image Processing, Sep. 19, 1996, 2:73-76.
Chow et al., "A lyapunov-based approach to safe reinforcement learning," Advances in Neural Information Processing Systems 31 (NeurIPS 2018), 2018, 10 pages.
Chromium.googlesource.com [online], "libvpx," Dec. 30, 2013, retrieved on Sep. 11, 2023, retrieved from URL<https://chromium. googlesource.com/webm/libvpx>, 2 pages.
Chromium.googlesource.com [online], "simple_encode.h," Feb. 11, 2022, retrieved on Sep. 11, 2023, retrieved from URL<https:// chromium.googlesource.com/webm/libvpx/+/master/vp9/encoder/ vp9_fi rstpass.h/>, 7 pages.
Chromium.googlesource.com [online], "vp9_firstpass.h," Feb. 22, 2022, retrieved on Sep. 11, 2023, retrieved from URL<https:// chromium.googlesource.com/webm/libvpx/+/master/vp9/encoder/ vp9_fi rstpass.h/>, 7 pages.
Cisco.com [online], "Cisco Annual Internet Report (2018-2023)," Mar. 18, 2020, retrieved on Sep. 9, 2023, retrieved from URL<https:// www.cisco.com/c/en/us/solutions/collateral/executive-perspectives/ annual-internet-report/white-paper-c11-741490.pdf/>, 35 pages.
Cloud.google.com [online], "Accelerate AI development with Google Cloud TPUs," May 17, 2017, retrieved on Sep. 8, 2023, retrieved from URL<https://cloud.google.com/tpu/>, 10 pages.
Coulom, "Efficient selectivity and backup operators in monte-carlo tree search," International Conference on Computers and Games, 2006, pp. 72-83.
Dabney et al., "Distributional reinforcement learning with quantile regression," Proceedings of the AAAI Conference on Artificial Intelligence, Apr. 29, 2018, 32(1):2892-2901.
Dabney et al., "Implicit quantile networks for distributional reinforcement learning," Proceedings of the 35th International Conference on Machine Learning, 2018, 80:1096-1105.
Dai et al., "Transformer-xl: Attentive language models beyond a fixed-length context," CoRR, Jan. 9, 2019, arXiv:1901.02860, 20 pages.
Developers.google.com [online], "VP9 Bitrate Modes in Detail," Apr. 20, 2019, retrieved on Sep. 11, 2023, retrieved from URL<https:// developers.google.com/media/vp9/bitrate-modes/>, 18 pages.
Efroni et al., "Exploration-exploitation in constrained MDPs," CoRR, Mar. 4, 2020, arxiv.org/abs/2003.02189, 44 pages.
Gao et al., "SSIM-based game theory approach for rate-distortion optimized intra frame ctu-level bit allocation," IEEE Transactions on Multimedia, Jun. 2016, 18(6):988-999.
Github.com [online], "google-deepmind/dm-haiku," Feb. 20, 2020, retrieved on Sep. 8, 2023, retrieved from URL<https://github.com/ google-deepmind/dm-haiku/>, 11 pages.
Github.com [online], "google-deepmind/optax," May 23, 2021, retrieved on Sep. 8, 2023, retrieved from URL<https://github.com/ google-deepmind/optax>, 7 pages.

He et al., "Identity mappings in deep residual networks," European Conference on Computer Vision, Sep. 17, 2016, pp. 630-645.
He et al., "Optimum bit allocation and accurate rate control for video coding via p-domain source modeling," IEEE Transactions on Circuits and Systems for Video Technology, Oct. 2002, 12(10):840-849.
Horgan et al., "Distributed prioritized experience replay," CoRR, Match 2, 2018, arXiv:1803.00933, 19 pages.
Hu et al., "Reinforcement learning for hevc/h.265 intra-frame rate control," 2018 IEEE International Symposium on Circuits and Systems (ISCAS), May 27-30, 2018, pp. 1-5.
Interntional Search Report and Written Opinion in International Appln. No. PCT/EP2022/064566, dated Oct. 4, 2022, 15 pages.
Github.com [online], "JAX: composable transformations of Python+ NumPy programs," Mar. 8, 2020, retrieved on Sep. 11, 2023, retrieved from URL<http://www.assaabloy.com/en/com/Press-News/ News/2011/NFC-enabled-mobile-access-in-aphysical-access-control-world/>, 13 pages.
Jiang et al., "On enhancing H.264/AVC video rate control by psnr-based frame complexity estimation," IEEE Transactions on Consumer Electronics, Feb. 2005, 51(1):281-286.
Kwon et al., "Rate control for h.264 video with enhanced rate and distortion models," IEEE Transactions on Circuits and Systems for Video Technology, May 2007, 17(5):517-529.
Kwon et al., "Rate control method based on deep rein forcement learning for dynamic video sequences in hevc," IEEE Transactions on Circuits and Systems for Video Technology, May 2007, 17(5):517-529.
Laterre et al., "Ranked reward: Enabling self-play reinforcement learning for combinatorial optimization," CoRR, Jul. 4, 2018, arXiv:1807.01672, 11 pages.
Levine et al., "End-to-end training of deep visuomotor policies," The Journal of Machine Learning Research, Jan. 1, 2016, 17(1):1334-1373.
Li et al., "λ domain rate control algorithm for high efficiency video coding," IEEE transactions on Image Processing, Sep. 2014, 23(9):3841-3854.
Lin, "Self-improving reactive agents based on reinforcement learning, planning and teaching," Machine Learning, May 1992, 8:293-321.
Ma et al., "Rate-distortion analysis for H.264/AVC video coding and its application to rate control," IEEE Transactions on Circuits and Systems for Video Technology, Dec. 2005, 15(12):1533-1544.
Mao et al., "Neural Rate Control for Video Encoding Using Imitation Learning," CoRR, Dec. 9, 2020, arXiv:2012.05339v1, 13 pages.
Mirhoseini et al., "Chip placement with deep reinforcement learning," CORR, Apr. 22, 2020, arXiv:2004.10746, 15 pages.
Mnih et al., "Playing atari with deep reinforcement learning," CoRR, Dec. 19, 2013, arXiv:1312.5602, 9 pages.
Mukherjee et al., "The latest open-source video codec VP9—an overview and preliminary results," 2013 Picture Coding Symposium (PCS), Dec. 8-11, 2013, pp. 390-393.
Netflixtechblog.com [online], "Toward A Practical Perceptual Video Quality Metric," Jun. 6, 2016, retrieved on Sep. 11, 2023, retrieved from URL<http://www.assaabloy.com/en/com/Press-News/News/ 2011/NFC-enabled-mobile-access-in-aphysical-access-control-world/>, 31 pages.
Office Action in Australian Appln. No. 2022279597, dated Sep. 21, 2023, 3 pages.
Paternain et al., "Constrained reinforcement learning has zero duality gap," Advances in Neural Information Processing Systems, 2019, pp. 7555-7565.
Salimans et al., "Evolution strategies as a scalable alternative to reinforcement learning," CoRR, Mar. 10, 2017, arXiv:1703.03864, 13 pages.
Sanz-Rodriguez et al., "RBF-based QP estimation model for VBR control in H.264/SVC," IEEE Transactions on Circuits and Systems for Video Technology, Sep. 2011, 21(9):1263-1277.
Schmidt et al., "Self-play learning without a reward metric," CoRR, Dec. 16, 2019, arXiv:1912.07557, 6 pages.
Schrittwieser et al., "Mastering Atari, Go, Chess and Shogi by Planning with a Learned Model," Nature, Dec. 23, 2020, 588(7839):604-609.

(56)         References Cited

OTHER PUBLICATIONS

Shi et al., "Reinforced Bit Allocation under Task-Driven Semantic Distortion Metrics," CoRR, Oct. 16, 2019, arXiv:1910.07392v1, 5 pages.

Silver et al., "Mastering the game of Go with deep neural networks and tree search," Nature, Jan. 28, 2016, 529(7587):484.

Tessler et al., "A deep hierarchical approach to lifelong learning in minecraft," Proceedings of the AAAI Conference on Artificial Intelligence, Feb. 12, 2017, 31(1):1553-1561.

Tessler et al., "Reward constrained policy optimization," CoRR, May 28, 2018, arxiv.org/abs/1805.11074, 15 pages.

Vinyals et al., "Grandmaster level in starcraft ii using multi-agent reinforcement learning," Nature, Oct. 30, 2019, 575(7782):350-354.

Wang et al., "Image quality assessment: from error visibility to structural similarity," IEEE Transactions on Image Processing, Apr. 2004, 13(4):600-612.

Wang et al., "Youtube UGC dataset for video compression research," 2019 IEEE 21st International Workshop on Multimedia Signal Processing (MMSP), Sep. 27-29, 2019, 5 pages.

Wen et al., "Trellis-based r-d optimal quantization in H.263+," IEEE Transactions on Image Processing, Aug. 2000, 9(8):1431-1434.

Zhang et al., " Reward constrained interactive recommendation with natural language feedback," CoRR, May 4, 2020, arxiv.org/abs/2005.01618, 13 pages.

Zhou et al., "Rate control method based on deep reinforcement learning for dynamic video sequences in HEVC," IEE Transactions on Multimedia, May 6, 2020, 23:1106-1121.

Office Action in Indian Appln. No. 202327058852, mailed on Jun. 12, 2025, 7 pages (with English translation).

International Preliminary Report on Patentability in International Appln. No. PCT/EP2022/064566, dated Dec. 7, 2023, 9 pages.

Decision to Grant Patent in Japanese Appln. No. 2023-560140, dated Apr. 30, 2024, 5 pages (with English translation).

Notice of Acceptance in Australian Appln. No. 2022279597, dated Jun. 26, 2024, 3 pages.

Office Action in Australian Appln. No. 2022279597, dated May 9, 2024, 3 pages.

Office Action in Australian Appln. No. 2024227268, mailed on Sep. 24, 2025, 2 pages.

Office Action in European Appln. No. 22734129.4, dated Jan. 12, 2026, 7 pages.

Office Action in Korean Appln. No. 2023-7033044, mailed on Mar. 6, 2026, 17 pages (with English translation).

Notice of Acceptance in Australian Appln. No. 2024227268, dated Mar. 27, 2026, 3 pages.

\* cited by examiner

400

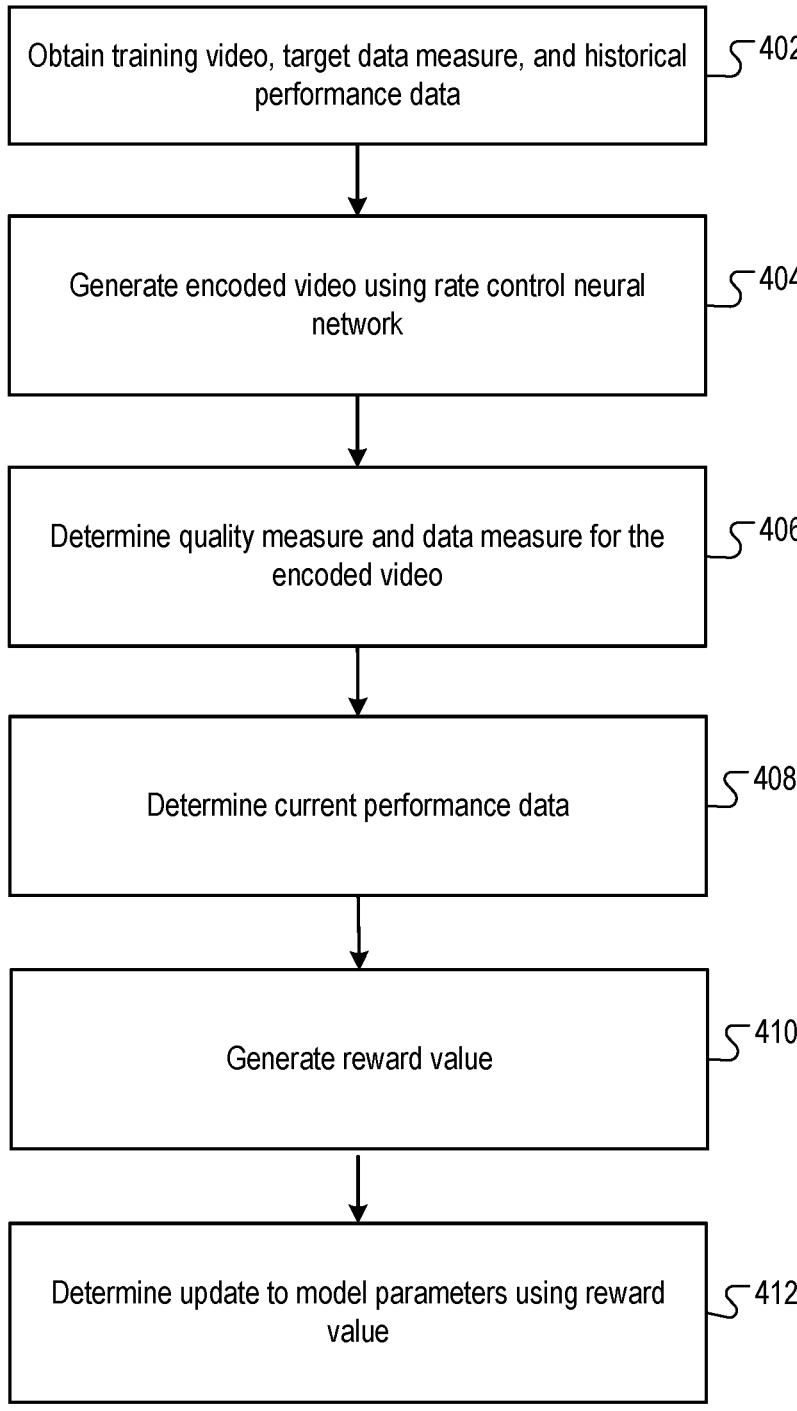

```
┌─────────────────────────────────────────────┐
│ Obtain training video, target data measure,  │── 402
│ and historical performance data              │
└─────────────────────────────────────────────┘
                      │
                      ▼
┌─────────────────────────────────────────────┐
│ Generate encoded video using rate control    │── 404
│ neural network                               │
└─────────────────────────────────────────────┘
                      │
                      ▼
┌─────────────────────────────────────────────┐
│ Determine quality measure and data measure   │── 406
│ for the encoded video                        │
└─────────────────────────────────────────────┘
                      │
                      ▼
┌─────────────────────────────────────────────┐
│ Determine current performance data           │── 408
└─────────────────────────────────────────────┘
                      │
                      ▼
┌─────────────────────────────────────────────┐
│ Generate reward value                        │── 410
└─────────────────────────────────────────────┘
                      │
                      ▼
┌─────────────────────────────────────────────┐
│ Determine update to model parameters using   │── 412
│ reward value                                 │
└─────────────────────────────────────────────┘
```

FIG. 4

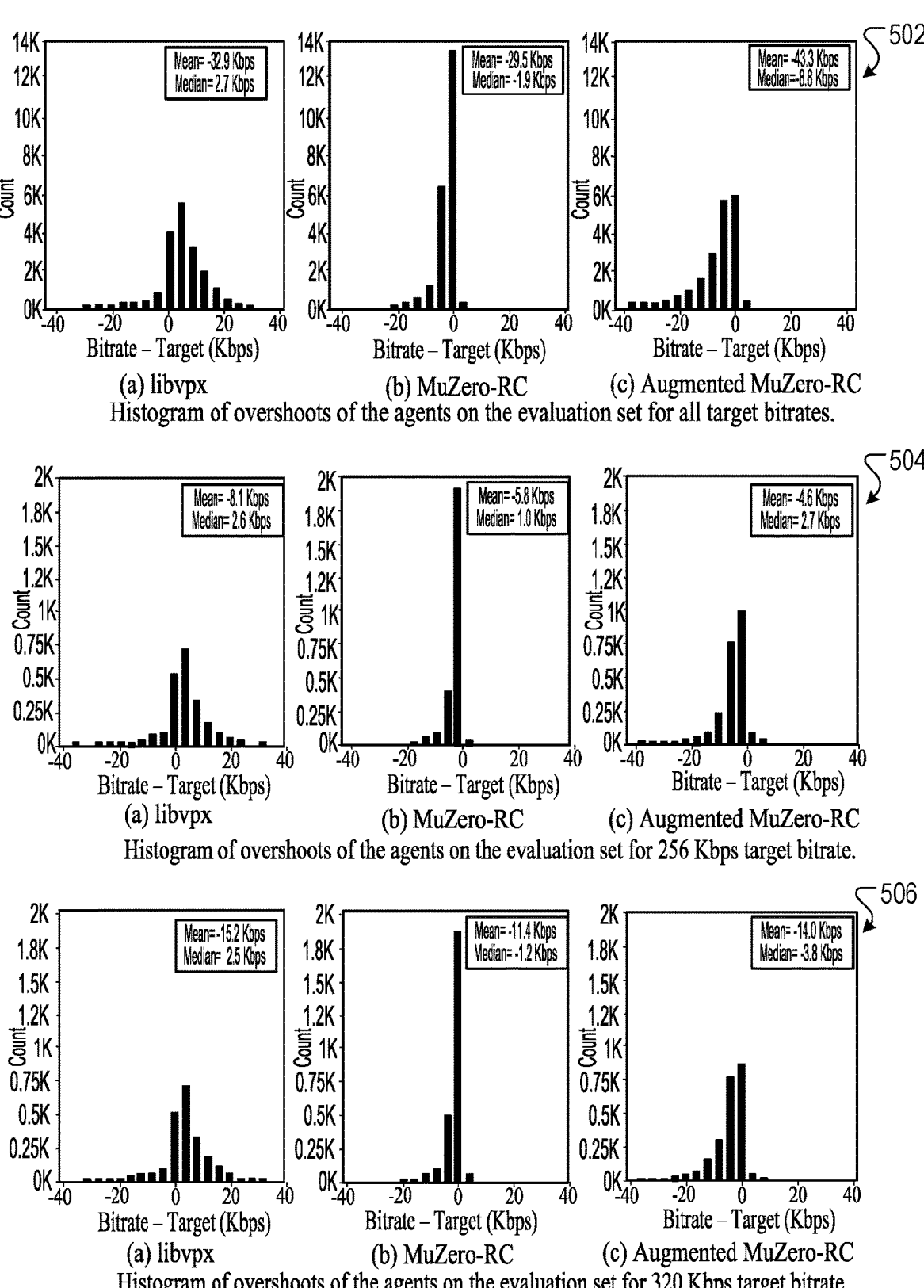

(a) libvpx                    (b) MuZero-RC                    (c) Augmented MuZero-RC Histogram of overshoots of the agents on the evaluation set for all target bitrates.

(a) libvpx                    (b) MuZero-RC                    (c) Augmented MuZero-RC Histogram of overshoots of the agents on the evaluation set for 256 Kbps target bitrate.

(a) libvpx                    (b) MuZero-RC                    (c) Augmented MuZero-RC Histogram of overshoots of the agents on the evaluation set for 320 Kbps target bitrate.

FIG. 5

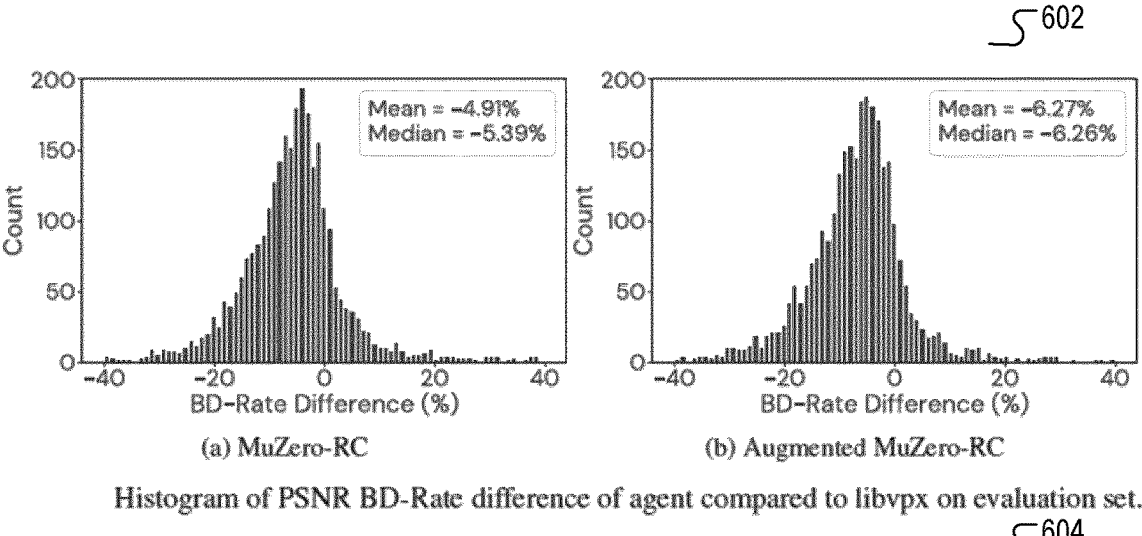
(a) MuZero-RC                    (b) Augmented MuZero-RC
Histogram of PSNR BD-Rate difference of agent compared to libvpx on evaluation set.
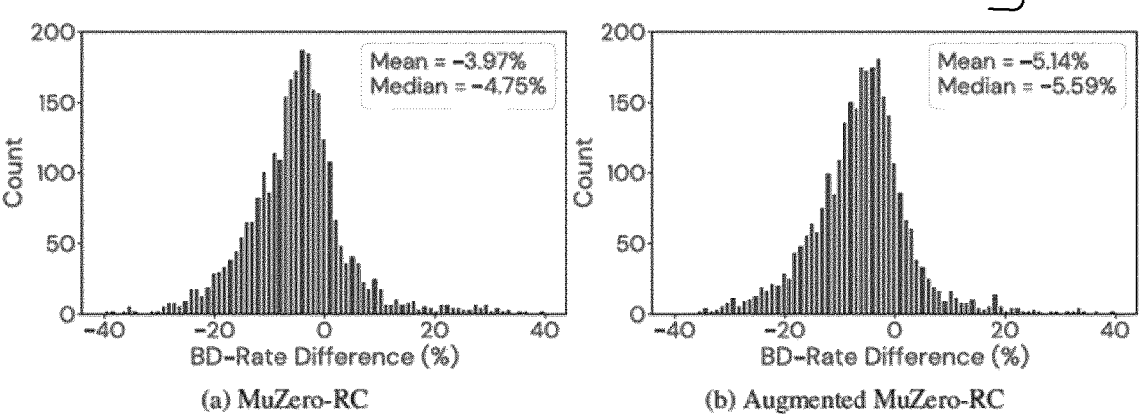
(a) MuZero-RC                    (b) Augmented MuZero-RC
Histogram of SSIM BD-Rate difference of agent compared to libvpx on evaluation set.
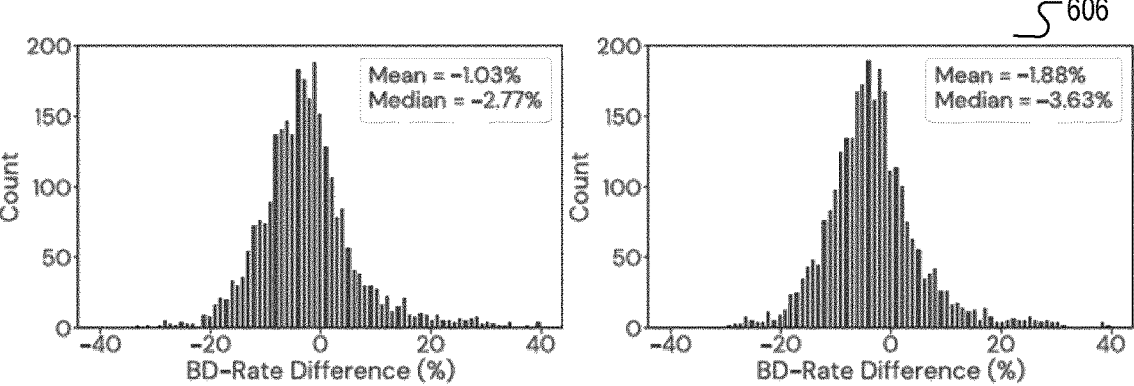
Histogram of VMAF BD-Rate difference of agent compared to libvpx on evaluation set.
FIG. 6

TRAINING RATE CONTROL NEURAL NETWORKS THROUGH REINFORCEMENT LEARNING

CROSS-REFERENCE TO RELATED APPLICATIONS

This application is a National Stage Application under 35 U.S.C. § 371 and claims the benefit of International Application No. PCT/EP2022/064566, filed May 30, 2022, which claims the benefit of priority to U.S. Provisional Application Ser. No. 63/194,940, filed May 28, 2021, the entirety of which is incorporated herein by reference.

BACKGROUND

This specification relates to using a neural network to perform rate control for a video codec.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from received inputs in accordance with current values of a respective set of parameters.

SUMMARY

This specification describes a system implemented as computer programs on one or more computers in one or more locations that trains a neural network that is used to control the amount of data that is used to represent a video after the video has been encoded.

Particular embodiments of the subject matter described in this specification can be implemented so as to realize one or more of the following advantages.

Variable rate video encoders attempt to encode videos to maximize the quality of the encoded video, i.e., to maximize the quality of the reconstruction that is generated from the encoded video relative to the original video, subject to the constraint that the bitrate of the encoded video cannot exceed a target bitrate.

In particular, conventional variable rate video encoders apply rate control to each video frame in order to define how many bits to spend to encode the frame. In many of these video encoders, rate control is a critical component and has been heavily engineered, i.e., applies complicated manually-engineered heuristics.

However, rate control is a challenging constrained planning problem because of the complex dependency among decisions for different video frames and the fact that whether the bitrate constraint is satisfied is only apparent at the end of the video, i.e., after the entire video has been encoded.

This specification describes techniques for training a rate control neural network through reinforcement learning and using the rate control neural network to perform rate control when encoding videos.

By using a rate control neural network that is trained as described in this specification to perform rate control (by proposing quantization parameter values for use by a video codec in encoding the video), the resulting encoded videos achieve better encoding efficiency relative to conventional approaches that rely on manually engineered rate control modules or that use different rate control neural networks. Additionally, by using the described rate control neural network, the resulting encoded videos have minimal to no constraint violations. In other words, given a target bitrate for a video, a video encoded using the described rate control neural network will have a bitrate that does not exceed the target while generally achieving a higher quality, e.g., as measured by peak signal-to-noise ratio (PSNR) or other quality measure, than videos encoded using other rate control techniques.

More specifically, this specification describes generating reward values for the training of the rate control neural network by comparing a current performance for a given training example to a historical performance for the given training example over preceding training iterations. The training example comprises an example video sequence—referred to as a "training sequence" or "training video"—to be encoded, and a value for a target data measure, e.g. a target data size of the encoded training sequence. The rate control network is trained iteratively, and the current performance is a performance of encoding the training video using the rate control network in its current state (i.e. given the current values of the parameters of the neural network at the current training iteration). Thus, the reward value indicates how well the training video is encoded by the rate control neural network in its current state, compared to how well it is encoded by the rate control neural networks at corresponding iterations before the current iteration. Generating the reward value in this manner gives the rate control neural network a high quality learning signal from the outset of training and greatly improves the efficiency of the training process, i.e., reduces the amount of wall clock time and computational resources required to train the rate control neural network. By contrast, comparing the current performance to a baseline policy for the given training example to compute the reward value can result in a recently initialized rate control neural network very rarely exceeding the baseline and therefore only infrequently receiving a non-zero reward at the beginning of training, potentially significantly extending the number of training iterations that are required or even causing the training not to converge. Computing the reward values as described in this specification, on the other hand, removes this obstacle as the current performance will frequently exceed the historical performance even at the outset of training.

Some approaches may attempt to apply reinforcement learning to the rate control setting by solving a constrained reinforcement learning objective through Lagrangian relaxation. When applied to the rate control setting, however, Lagrangian relaxation approaches become difficult to tune correctly because the penalty factors can be different for different videos based on the content of the videos. Applying reinforcement learning using the reward computation scheme described in this specification, on the other hand, avoids needing to tune such hyperparameters, i.e., avoids needing to determine penalty factors for different videos.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process for training the rate control neural network.

FIG. 5 shows histograms of overshoots achieved by the described techniques.

FIG. 6 shows histograms of BD-rate differences of the described techniques relative to the libvpx technique.

Like reference numbers and designations in the various drawings indicate like elements.

DETAILED DESCRIPTION

Figure 1:
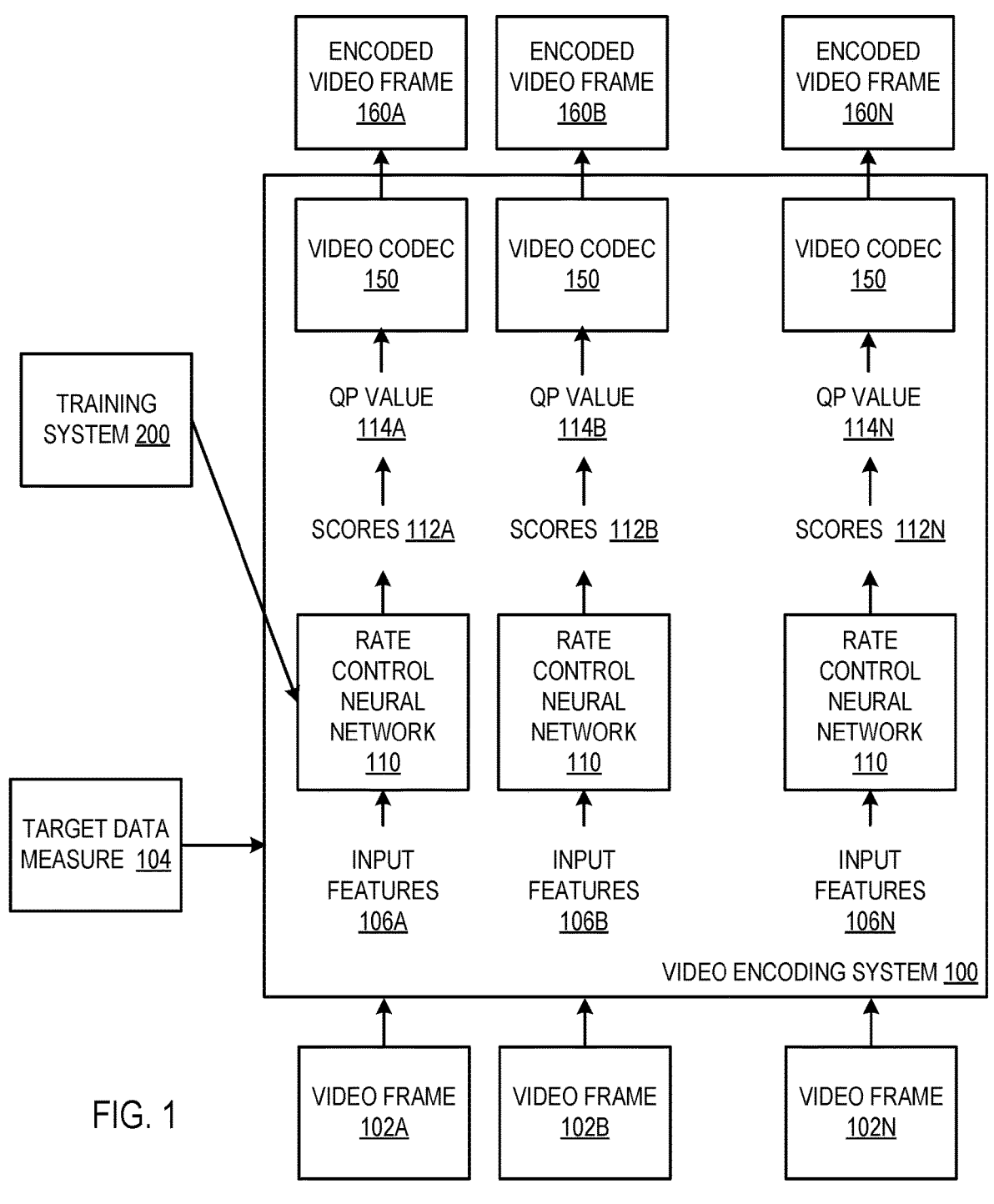
FIG. 1 shows an example video encoding system.

FIG. 1 shows an example video encoding system 100. The video encoding system 100 is an example of a system implemented as computer programs on one or more computers in one or more locations in which the systems, components, and techniques described below are implemented.

The video encoding system 100 is a system that encodes videos, i.e., sequences of video frames, to generate encoded representations of the videos, i.e., representations that require less data to transmit or store than the original video. The videos may for example be videos which were captured by at least one video camera, depicting at least one portion of the real world.

More specifically, the system 100 receives an input video, i.e., a sequence of video frames 102A-N, and encodes the input video using a video codec 150 to generate an encoded representation of the input video, i.e., a sequence of encoded video frames 160A-160N.

The encoded representation represents each frame in the input video using a respective amount of data. The amount of data that is required to represent a given video frame can be measured in any appropriate unit of measurement, e.g., as a number of bits.

The video codec 150 is software that compresses (and, later, decompresses) videos by representing the video in a compressed data format that requires less data than the original data format of the video.

More specifically, the video codec 150 is a variable-rate codec that encodes different frames of the video using different amounts of data, e.g., using different numbers of bits.

In particular, the video codec 150 makes encoding decisions for video frames sequentially, i.e., encodes the video frames in the video sequentially one after the other. Prior to encoding each video frame, the video codec 150 assigns a quantization parameter (QP) value for the video frame. The QP value is an integer from a set of possible QP values, e.g., an integer in the range of [0; 255].

During encoding of the video frame, the video codec 150 monotonically maps the QP value to a quantization step size, which is used to digitalize prediction residue for entropy coding. The mapping from the QP value to the quantization step size may be predetermined; for example, the step size may be inversely proportional to the QP with predefined proportionality parameter. Smaller quantization step sizes lead to smaller quantization error, but also to a higher amount of data, e.g., higher number of bits, being used for encoding the video frame. Smaller quantization error generally results in smaller reconstruction error when the video frame is later decoded using the same video codec.

Thus, the QP value that is selected for a given video frame determines both the amount of data that is required to represent the video frame after the video frame has been encoded by the video codec 150 and the quality of the reconstruction of the video frame.

When a video is to be encoded it may initially be processed, e.g. as a whole, by the video encoder system 100 to create statistics for each of the frames, optionally to designate one or more of the frames of as "key-frames", and optionally to add additional frames, such as "alternate reference frames".

As a particular example, the video encoder system 100 can encode the video by first computing statistics ("first-pass statistics") for every frame in the video, e.g., by dividing the frame into blocks, e.g., non-overlapping 16×16 blocks, followed by performing per-block intra and inter-frame prediction and calculation of prediction residual error. These first-pass statistics contain information such as average motion prediction error, average intra-frame prediction error, average motion vector magnitude, percentage of zero motion blocks, noise energy, and so on.

The video encoder system 100 then uses the first-pass statistics to decide key-frame locations within the video, i.e. to designate ones of the video frames 102A-N as key-frame locations. Known techniques for choosing key-frames may be used for this. Some known video encoders also insert hidden alternate reference frames. The key-frames and alternate reference frames are used as references for encoding other frames, so their encoding quality affects other frames in the video as well. The alternate reference frames are "hidden" in the sense that, though encoded versions of them are typically included in the encoded video, when the encoded video is decoded and played the alternate reference frames are not displayed. In the case that the video encoder system 100 generates alternate reference frames, these may be added to the set of video frames for which the video encoder system 100 generates QP values. In other words, the set of input frames 102A-N shown in FIG. 1 is supplemented by adding these alternate video frames.

With those decisions made, the video encoder system 100 starts to encode video frames 102A-N sequentially. The rate controller regulates the trade-off between rate and distortion by specifying a QP to each frame (including to each hidden alternate reference frame, if any) in order to maximize the quality and reduce the bits. The QP is an integer in range [0, 255] that can be monotonically mapped to a quantization step size which is used for quantizing the frequency transform of the prediction residue for entropy coding. Smaller quantization step sizes lead to smaller quantization error but also higher bits usage for the frame. Thus, as indicated above, smaller quantization error means smaller reconstruction error which can be measured by, e.g., mean squared error (MSE).

The video codec 150 can be any appropriate variable-rate video codec that can accept as input a respective QP value for each video frame in a video and encode the video frames in accordance with the respective QP values. Examples of such video codecs include VP9 and the open source version libvpx. Another example of such a video codec is the AV1 video codec.

Generally, the system 100 encodes videos to satisfy a desired trade-off between video quality and the amount of data required to represent the encoded video. In particular, when encoding any given video, the system 100 receives as input a target data measure 104 for the encoding.

The target data measure 104 represents a target amount of data that should be required to represent the encoded representation of the input video, e.g., a maximum amount of data that can be required to represent the encoded representation of the input video. The target data measure 104 can be expressed using any appropriate unit of measurement. For example, the target data measure 104 can be a target bitrate for the encoded video. The bitrate of an encoded video is equal to the sum of bits of all encoded frames divided by the duration of the video.

The system 100 then attempts to encode the video to maximize the quality of the encoded representation without exceeding the target data measure 104.

The quality of the encoded representation can be measured by an appropriate quality measure that measures the quality of a reconstruction generated from the encoded representation relative to the original video. One example of such a quality measure is Peak Signal-to-Noise Ratio (PSNR), which measures the video quality (a.k.a., distortion) and is proportional to the log-sum of the mean squared error of all show frames (excluding any hidden alternate reference frames). The mean squared error of a given frame is the mean squared error between the reconstruction of the frame and the raw frame before encoding. Other quality measures that can be used include other distortion metrics such as SSIM and VMAF.

In order to maximize the encoding quality subject to the constraint imposed by the target data measure 104, the system 100 makes use of a rate control neural network 110.

The rate control neural network 110 is a neural network that, prior to the encoding of a given video frame, receives as input a set of input features for the given frame, e.g., e.g., input features 106A-106N, and generates as output a respective set of scores for the given frame, e.g., respective scores 112A-112N. Possible choices for the input features 106A-106N are discussed below with reference to FIG. 3. Each set of scores includes a respective score for each of the possible QP values, e.g., a respective score for each integer in the range [0; 255] or a different range of possible QP values.

Once the rate control neural network 110 has generated a set of scores for a given video frame, the system 100 selects a QP value using the set of scores, e.g., by selecting the QP value with the highest score or by sampling from a distribution defined by the set of scores, and then uses the video codec 150 to encode the video frame in accordance with the selected QP value.

An example architecture for the rate control neural network 110 and more detail about the input features that are processed by the rate control neural network 110 are described below with reference to FIG. 3.

Thus, the system 100 uses the rate control neural network 110 to perform rate control during encoding, i.e., by selecting the QP value for each video frame using the scores generated by the neural network 110, instead of using manually-engineered heuristic-based approaches as is done by conventional video encoders.

In order to allow the rate control neural network 110 to be effectively used to select QP values, i.e., to select QP values that result in the desired trade-off between quality and data efficiency being achieved, a training system 200 trains the rate control neural network 110 through reinforcement learning before the rate control neural network 110 is used by the system 100.

Training the rate control neural network 110 will be described below with reference to FIGS. 2-4.

Once an input video has been encoded, the system 100 can use the encoded representation for any of a variety of purposes.

As one example, the system 100 can store the encoded representation for later reconstruction and playback, thereby reducing the amount of memory required to store the video.

As another example, the system 100 can transmit the encoded representation to another system over a data communication network, e.g., the Internet, for decoding and playback, thereby reducing the amount of data that needs to be transmitted over the data communication network.

In either example, a decoding system, which can be implemented on the same set of one or more computers or on a different set of one or more computers from the system 100, can later access the encoded representation, e.g., from memory or upon receipt of the encoded representation over a data communication network, and use another instance of the video codec 150 to generate a reconstruction of the video. The decoding system can then provide the reconstruction of the video for playback to a user.

Figure 2:
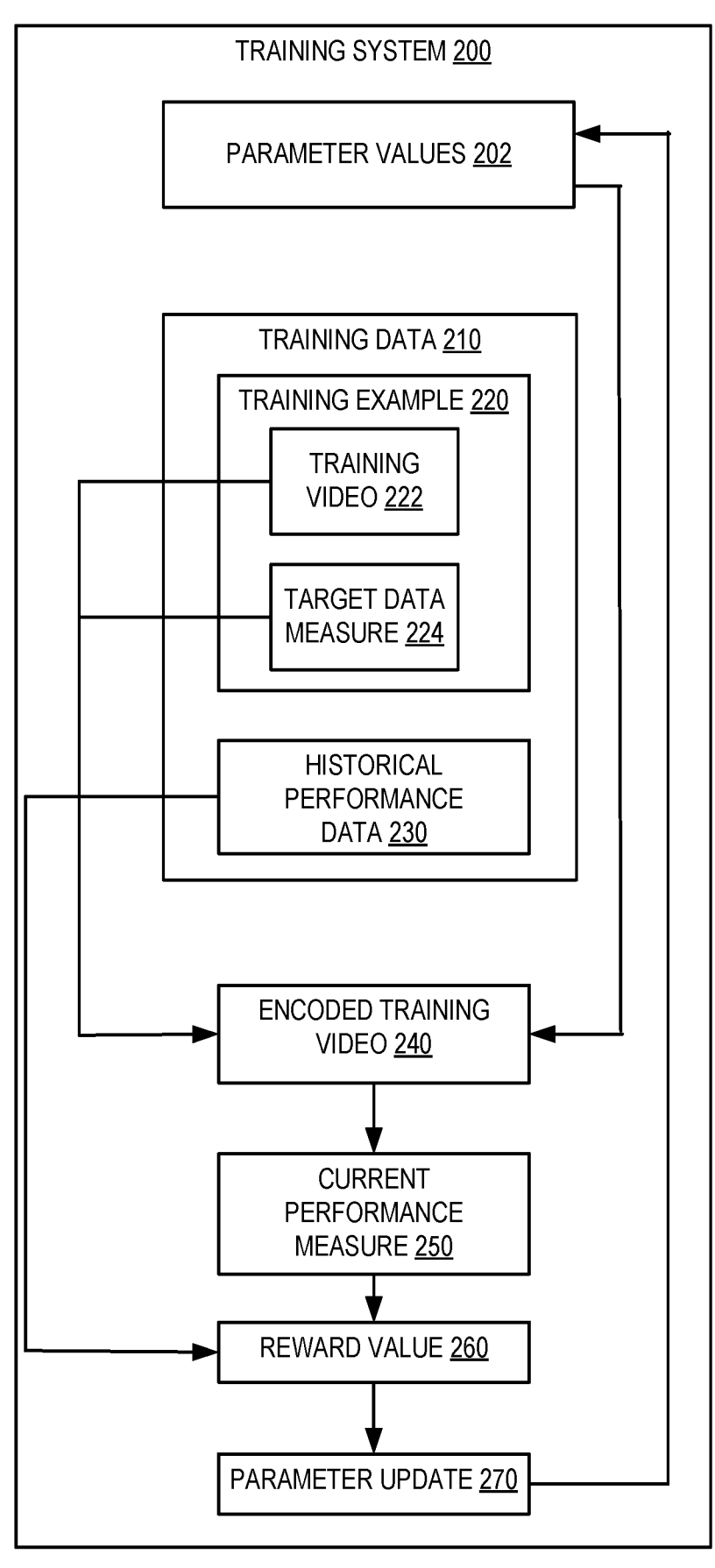
FIG. 2 shows an example training system.

FIG. 2 shows an example training system 200. The training system 200 is an example of a system implemented as computer programs on one or more computers in one or more locations in which the systems, components, and techniques described below are implemented.

As described above, the training system 200 trains the rate control neural network 110 so that the rate control neural network 110 can be used to effectively encode videos, i.e., so that videos encoded using the rate control neural network 110 achieve a desired trade-off between data efficiency and video quality.

More specifically, the training system 200 can train the rate control neural network 110 so that the rate control neural network 110 can be used to encode a given video to maximize the quality of the encoded video subject to a constraint that the amount of data needed to represent the encoded video does not exceed a target data measure for the given video.

In particular, the training system 200 trains the rate control neural network 110 on training data 210 by repeatedly updating values 202 of the parameters of the rate control neural network 110.

The training data 210 includes multiple training examples 220.

Each training example 220 includes a training video 222, i.e., a sequence of video frames, and a target data measure 224 for the training video 220. The target data measure 224 represents the maximum amount of data that should be required to represent an encoded video that is generated by encoding the training video 222. For example, the target data measure 224 can be a target bitrate for the encoded representation of the training video 222.

The training system 200 also maintains, for each training example 220, respective historical performance data 230 that, at any given time point during the training, measures the performance of the rate control neural network 110 in effectively encoding the training video 222 subject to the target data measure 224, i.e., that measures both the quality of the encoded representations of the training video 222 that have been generated using the rate control neural network 110 and the amount of data required to represent the encoded representations relative to the target data measure 224.

To train the rate control neural network 110, the training system 200 repeatedly samples training examples 220 from the training data 210, e.g., randomly or in accordance with a prioritized sampling scheme, and uses the sampled training examples 220 to update the parameter values 202.

In more detail, once a training example 220 has been sampled, the training system 210 uses the training video 222 and the target data measure 224 to generate an encoded representation of the training video 222, i.e., an encoded training video 240.

In some implementations, the system 200 directly uses the sets of scores generated by the rate control neural network 110 to select the QP values that are provided to the video codec for encoding the training video, i.e., uses the neural network 110 to encode the video as described above with reference to FIG. 1.

In some other implementations, the system 200 uses the rate control neural network 110 perform a look-ahead search in order to select the QP values that are provided to the video codec for encoding the training video. Performing a look-ahead search during training is described below with reference to FIGS. 3 and 4.

Once the encoded training video 240 has been generated, the training system 200 determines current performance data 250 for the training example 220 and then determines a reward value 260 for the training example 220 from the current performance data 250 and the historical performance data 230.

The current performance data 250 measures the quality of the encoded training video 240 and the amount of data required to represent the encoded training video 240.

Thus, the reward value 260 measures how well the neural network 110 performed in generating the current encoded training video 240 relative to how the neural network 110 has previously performed in encoding the training example 220 during the training.

Determining the performance and the reward value 260 is described in more detail below with reference to FIG. 4.

The system 200 can then determine an update 270 for the parameters through reinforcement learning using the reward value 260.

In particular, the system can determine the update using any appropriate reinforcement learning technique that encourages the rate control neural network 110 to generate outputs that result in encoded videos that maximize the expected reward values.

As one example, the system can determine the update 270 using a policy gradient technique, e.g., a REINFORCE or proximal policy optimization (PPO) technique.

As another example, when the system performs a look-ahead search during the training, the system can determine the update 270 using a MuZero technique.

Generally, however, the system determines the update 270 by computing gradients with respect to the parameters of the rate control neural network 110 of an objective function for the reinforcement learning technique.

The system also updates the historical performance data 230 for the training example 220 using the current quality and current data measure. For example, the historical performance data may be respective exponential moving averages (EMA) of the quality and data measure for the sequence of iterations, e.g. characterized by a smoothing factor (or interpolation weight) a in the range 0 to 1.

Figure 3:
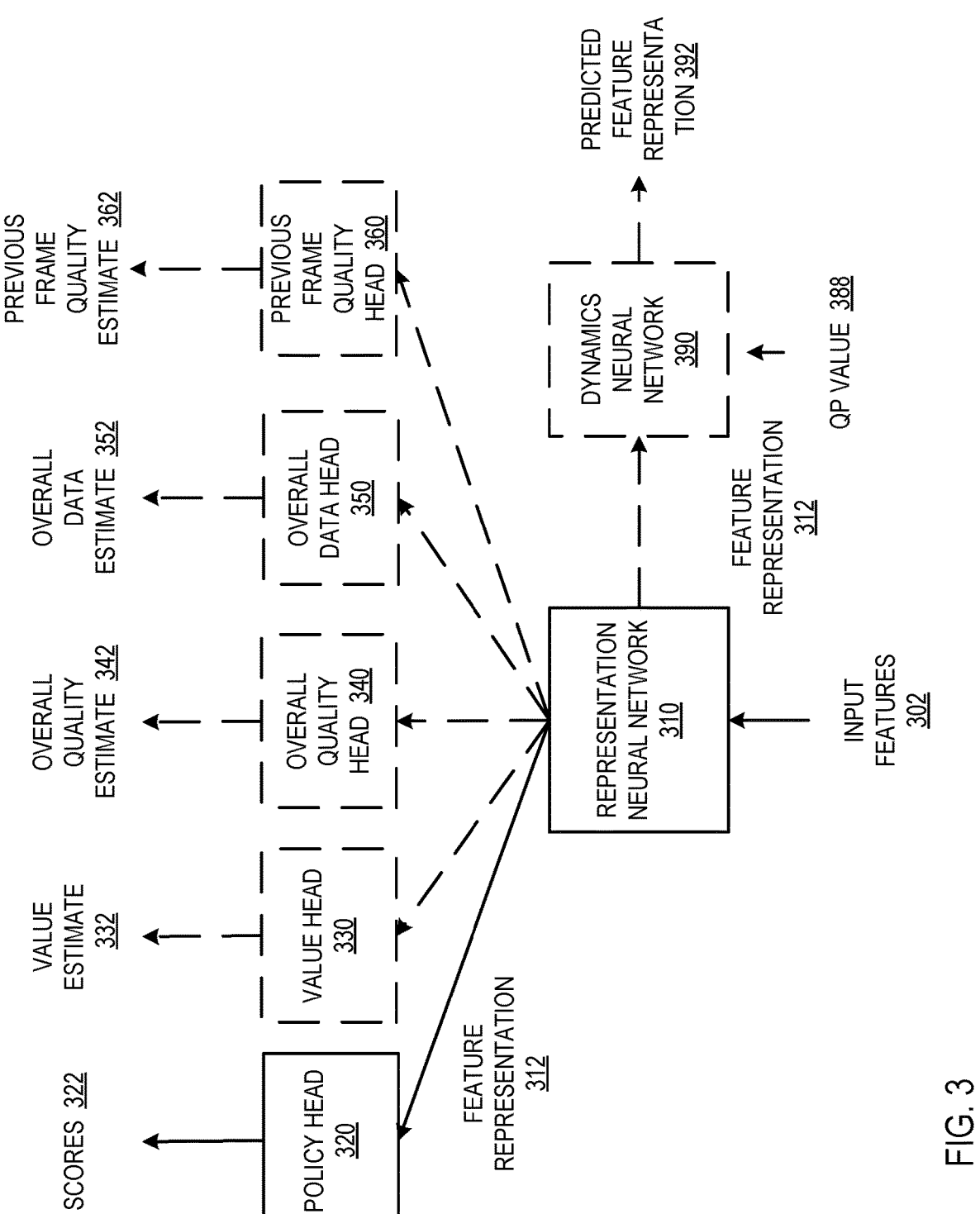
FIG. 3 shows an example architecture of the rate control neural network.

FIG. 3 shows an example architecture of the rate control neural network 110. That is, FIG. 3 shows an example architecture of a neural network that can be used by a system, e.g., the video encoding system 100 of FIG. 1 or the training system 200 of FIG. 2, to encode a video.

In particular, as shown in FIG. 3, the rate control neural network 110 includes a representation neural network 310 that receives a set of input features 302 for a current video frame from a current video and processes the input features 302 to generate a feature representation 312.

The set of input features 302 generally includes a respective set of frame features for each of the frames in the current video.

More specifically, the frame features include first-pass features for each of the corresponding frames in the current video and second pass features of the frames that have already been encoded. The first-pass features can comprise some or all of the first-pass statistics generated by the video encoder, as described above with reference to FIG. 1. Thus, the frame features for a current frame may include any one or more of average motion prediction error, average intra-frame prediction error, average motion vector magnitude, percentage of zero motion blocks, noise energy, and so on, for the current frame.

In particular, the second pass features for each already encoded frame can include any of: the data measure for the encoded frame, the quantization parameter value selected for the encoded frame, the quality measure for the encoded frame, the frame type, e.g., show frame or alternate reference frame, and so on.

To generate the respective frame features for a frame that has already been encoded, the system can concatenate the first pass features for the frame and the second pass features for the frame.

To generate the respective frame features for a frame that has not yet been encoded, the system can concatenate the first pass features for the frame and a pre-determined default set of second pass features, e.g., a set of features that are all zeroes or some other pre-determined number.

The set of input features 302 can also include meta-data features characterizing the current video, the current frame or both. Examples of meta-data features can include current frame type (e.g. whether the current frame is a key-frame, an alternate reference frame, or a frame which is neither a key-frame nor an alternate reference frame), current frame index (i.e., location within the video), total number of frames in the video, and the target data measure for the video.

The representation neural network 310 can have any appropriate architecture that allows the representation neural network 310 to map the input features 302 to a feature representation 312 and can include any appropriate number of neural network layers, e.g., convolutional layers, fully-connected layers, normalization layers, and so on, arranged in any appropriate configuration.

As a particular example, the representation neural network 310 can process the respective frame features using a Transformer neural network that includes one or more self-attention blocks that each apply self-attention or multi-head self-attention mechanisms to generate a representation of the frame features. In some cases, the representation neural network 310 can process the meta-data features using a multi-layer perceptron (MLP) to generate a representation of the meta-data features. The representation neural network 310 can then combine, e.g., concatenate or average, the representation of the frame features and the representation of the meta-data features to generate the feature representation 312. In some other cases, the representation neural network 310 can directly concatenate the meta-data features with the representation of the frame features and use the concatenation to generate the feature representation 312. For example, the neural network 310 can process the concatenation through a multi-layer perceptron (MLP) and then process the output of the MLP by one or more convolutional layer blocks, e.g., ResNet or ResNet-V2 blocks, to generate the feature representation 312.

The feature representation 312 is a numeric representation of the set of input features 302. In particular, the feature representation is an ordered collection of numeric value, e.g., a vector of floating point values or other numeric values.

The rate control neural network 110 also includes a policy neural network head 320 that processes the feature representation 310 to generate a set of scores 322 that includes a respective score for each possible value of the quantization parameter.

A "neural network head" as used in this specification is a collection of one or more neural network layers.

As a particular example, the policy head 320 can include a sequence of linear neural network layers that are separated by non-linear activation function layers, e.g., rectified linear unit (ReLU) layers, normalization layers, e.g., Batch Normalization layers or Layer Normalization layers, or both.

After training, the system can use the scores 322 to select the value of the quantization parameter that is used by the video codec to encode the current video frame. That is, after training, the rate control neural network 110 includes only the representation neural network 310 and the policy head 320.

In some implementations, during training, the system also uses one or more additional components in order to improve the effectiveness of the training process.

In particular, as described above, in some implementations, the system performs a look-ahead search during the training in order to more effectively select the QP values that are used to encode the video.

In these implementations, the system can make use of a dynamics neural network 390 to perform the look-ahead search.

The dynamics neural network 390 is configured receive as input the feature representation 312 and a QP value 388 and to generate as output a predicted feature representation 392 that would be generated by the representation neural network 310 for the next video frame if the QP value 388 was used to encode the current video frame represented by the feature representation 312.

The dynamics neural network 390 can have any appropriate architecture that allows the neural network to map the feature representation and the QP value to a predicted feature representation. For example, the dynamics neural network 390 can be a multi-layer perceptron (MLP). As another example, the dynamics neural network 390 can process the QP value 388 through a sequence of linear layers, and then element-wise add the resulting representation to the feature representation 312. The dynamics neural network 390 can then process the output of the element-wise addition by one or more convolutional layer blocks, e.g., ResNet or ResNet-V2 blocks, to generate the predicted feature representation 392.

When the dynamics neural network 390 is used during the training to perform the look-ahead search, the system trains the neural network 390 jointly with the rate control neural network 110.

Using the dynamics neural network 390 to perform the look-ahead search and training the neural network 390 are described below with reference to FIG. 4.

In some cases, the reinforcement learning technique being used to train the rate control neural network 110 may require a value prediction for each video frame that represents the value, i.e., in terms of expected future reward, of the current state of the encoding process as of the video frame. In these cases, the system uses a value neural network head 330 that processes the feature representation 312 to generate a value estimate 332 that represents an estimate of the value of current state of the encoding process. In some cases, the value neural network head 330 can be an MLP that directly outputs a single value estimate. In some other cases, the value neural network head 330 can include an MLP followed by an implicit quantile network (IQN) layer that generates an approximation of a distribution of value estimates.

Additionally, in some implementations, the system also trains the rate control neural network 110 on one or more auxiliary tasks jointly with the training of the neural network 110 on the main task through reinforcement learning.

Each auxiliary task involves processing the feature representation 312 through a corresponding auxiliary neural network head to generate an output for the auxiliary task.

One example of an auxiliary task is an overall quality prediction task that requires predicting the overall quality of the encoded video when encoding each frame in the video (e.g. according to a predefined quality criterion, such as a measure of the difference between a decoded video frame obtained from the encoded video frame, and the original video frame). When the overall quality prediction task is included as part of the training, the system uses an overall quality neural network head 340 that is configured to process the feature representation 312 to generate an overall quality estimate 342 that is a prediction of the overall quality of the encoded video. In some cases, the head 340 can be an MLP that directly outputs a single quality estimate. In some other cases, the head 340 can be an MLP that generates an approximation of a distribution of quality estimates, e.g., by generating an output that specifies the quantiles of the distribution.

Another example of an auxiliary task is an overall data prediction task that requires predicting the total amount of data required to represent the encoded video, e.g., the total bitrate of the encoded representation. When the overall data prediction task is included as part of the training, the system uses an overall data neural network head 350 that is configured to process the feature representation 312 to generate an overall data estimate 352 that is a prediction of the total data required to represent the encoded video, e.g., the bitrate of the encoded representation. In some cases, the head 350 can be an MLP that directly outputs a single data estimate. In some other cases, the head 350 can be an MLP that generates an approximation of a distribution of data estimates, e.g., by generating an output that specifies the quantiles of the distribution.

Another example of an auxiliary task is a previous quality prediction task that requires predicting the quality of the previously encoded frame, i.e., the frame that was encoded immediately before the current frame. When the previous frame quality prediction task is included as part of the training, the system uses a previous frame quality neural network head 360 that is configured to process the feature representation 312 to generate a previous frame quality estimate 362 that is a prediction of the quality of the previously encoded frame. In some cases, the head 360 can be an MLP that directly outputs a single quality estimate. In some other cases, the head 360 can be an MLP that generates an approximation of a distribution of quality estimates, e.g., by generating an output that specifies the quantiles of the distribution.

Another example of an auxiliary task is a previous data prediction task that requires predicting the amount of data required to represent the previously encoded frame, e.g., the number of bits required to represent the previously encoded frame or the log of the number of bits. When the previous data prediction task is included as part of the training, the system uses a previous data neural network head (not shown in FIG. 3) that is configured to process the feature representation 312 to generate a previous data estimate that is a prediction of the amount of data required to represent the previously encoded frame. In some cases, the head can be an MLP that directly outputs a single data estimate. In some other cases, the head can be an MLP that generates an approximation of a distribution of data estimates, e.g., by generating an output that specifies the quantiles of the distribution.

For each auxiliary task that is used during the training of the neural network 110, the objective function includes a respective term for the auxiliary task that measures errors between the predicted output for the task and a ground truth output for the task. For example, when the predicted output for the task is a single value, the term can be a mean-squared error or L2 error term. When the predicted output for the task approximates a distribution of possible values, the term can be a distributional error term, e.g., an IQN loss term or a quantile regression loss term.

Because each auxiliary task takes as input the feature representation 312, the gradients of these terms can be used to update the parameters of the corresponding auxiliary heads and also the parameters of the representation neural network 310 through backpropagation. That is, gradients of a given auxiliary term can be backpropagated through the corresponding auxiliary head and into the representation neural network 310 to update the values of the parameters of the representation neural network 310.

FIG. 4 is a flow diagram of an example process 400 for training the rate control neural network. For convenience, the process 400 will be described as being performed by a system of one or more computers located in one or more locations. For example, a training system, e.g., the training system 200 of FIG. 2, appropriately programmed, can perform the process 400.

The system can repeatedly perform the process 400 for training examples sampled from a set of training data in order to repeatedly update the parameters of the rate control neural network.

The system obtains a training example that includes a training video, i.e., a sequence of video frames, and a target data measure for the training video (step 402).

The system also obtains historical performance data for the training video that measures the effectiveness of the rate control neural network in encoding the training video as of the current time point in the training, i.e., as of the current iteration of the process 400.

Generally, the historical performance measures (i) the historical quality according to a quality measure, e.g., PSNR, SSIM, VMAF or CoinVQ and (ii) the historical data efficiency relative to the target data measure.

As a particular example, the historical performance data can include (i) an exponential moving average of the quality measures previously computed for the training example and (ii) an exponential moving average of the overshoot of the data measures previously computed for the training example. The overshoot for a particular encoding run is the difference between the data measure for the encoding run and the target data measure.

If the system has not yet used the training example for training, in some implementations, the system can initialize the moving averages for the training example to a predetermined default value. For example, the system can set the exponential moving average of the quality measures to a predetermined positive integer while setting the exponential moving average of the overshoot to zero. In some other implementations, the system can generate the initial moving averages by processing the training video (or features of the training video) and data specifying the target data measure using a neural network that has been trained to process training video—target data measure pairs or training video feature—target data measure pairs to generate predicted baseline quality measures and baseline overshoot measures for each pair. The system can then initialize the EMAs to be equal to the corresponding baseline measures as generated by the neural network.

The system generates an encoded video from the training video using the rate control neural network and in accordance with current values of the parameters of the rate control neural network (step 404).

In particular, for each video frame in the training video, the system generates a policy output that includes a respective policy score for each of the possible quantization parameter values, selects a quantization parameter value using the policy output, and then encodes the video frame in accordance with the quantization parameter value using the video codec. For example, the system can select the quantization parameter value that has the highest policy score or can sample a quantization parameter value from a distribution defined by the respective policy scores for the training video.

In some implementations, for a given frame, the system processes a set of features for the given video frame using the rate control neural network as described above to generate a respective set of scores and then uses the scores generated by the rate control neural network as the policy scores, i.e., selects the quantization parameter value to be used for the given video frame directly from the output of the rate control neural network.

In some other implementations, the system performs a look-ahead search guided by the rate control neural network and using the dynamics neural network to generate the policy output.

When performing the look-ahead search, the system initializes a tree that represents states of the encoding process that has a root node representing the current state of the encoding process as of the current frame. A "state" of the encoding process corresponds to a point in the encoding process where all frames before a current frame for the state have been encoded and the system needs to determine the QP value for the current frame.

The system then performs multiple planning iterations to generate the policy output. Each planning iteration generally involves performing a look ahead search, e.g., a Monte-Carlo tree search, to repeatedly (i.e., at each of multiple planning steps of each planning iteration) select a respective QP value according to compiled statistics for a corresponding node-edge pair in the state tree. This allows for the system to traverse possible future states of the encoding process starting from the current state characterized by the current feature representation.

More specifically, at each planning iteration, the system begins the look ahead search starting from the root node of the state tree and continues the look ahead search using the dynamics neural network 390 and statistics that have been compiled for the nodes in the tree until a possible future state that is represented by a leaf node in the state tree is identified. The system then expands the leaf node using the policy head 320, the value head 330, or both, and updates the statistics that have been compiled for the nodes in the tree. After the last planning iteration, the system generates the policy output from the compiled statistics for the root node of the tree.

Performing the tree search is referred to as the "MuZero" technique and is described in more detail in J. Schrittwieser, I. Antonoglou, T. Hubert, K. Simonyan, L. Sifre, S. Schmitt, A. Guez, E. Lockhart, 430 D. Hassabis, T. Graepel, T. P. Lillicrap, and D. Silver. Mastering Atari, Go, Chess and Shogi by Planning with a Learned Model. Nature, 588 (7839):604-609, 2020, the entire contents are hereby incorporated herein in their entirety.

The system computes a quality measure, e.g., a PSNR or other appropriate quality measure, and a data measure, e.g., bitrate or other appropriate data measure, for the encoded video (step 406).

The system determines current performance data for the encoded video, i.e., as represented by the data measure and the current overshoot, i.e., the difference between the current data measure and the target data measure (step 408).

The system then determines the reward value for the training example from the historical data and the current performance data (step 410).

The system can compute the reward value in any of a variety of ways.

As one example, if either the current overshoot or the exponential moving average (EMA) overshoot are greater than zero, the system can set the reward value to a positive value, e.g., one, if the current overshoot is less than or equal to the EMA overshoot and, if not, set the reward value to a negative value, e.g., −1. If the neither the current overshoot nor the EMA overshoot are greater than zero, the system can set the reward equal to the positive value if the current quality measure is the same as or better than the EMA quality measure and, if not, set the reward value to the negative value.

As another example, the system can modify the above comparisons by replacing the current quality measure with a term ("current performance measure") that is equal to the quality measure minus the product of lambda and the overshoot, where lambda is a positive value, e.g., 0.005 or another value less than 0.01, and replacing the EMA quality measure with a term ("historical performance measure") that is equal to the EMA quality measure minus the product of lambda and the EMA overshoot.

As yet another example, the system can set the reward value to a positive value, e.g., one, if the current performance measure is greater than the historical performance measure by more than a first threshold amount and can set the reward value to a negative value, e.g., negative one, if the current performance measure is less than the historical performance measure by more than the first threshold amount.

In some of these cases, if the current performance measure is not more than the first threshold amount greater than or less than the historical performance measure, the system sets the reward value to zero.

In others of the cases, if the current performance measure is not more than the first threshold amount greater or less than the historical performance measure, the system uses the current overshoot and the EMA overshoot to determine the reward.

In particular, the system can set the reward value to the positive value if the EMA overshoot exceeds the current overshoot by more than a second threshold amount, set the reward value to the negative value if the current overshoot is less than the current overshoot by more than the second threshold amount, and set the reward to zero otherwise. The first and second values can be, e.g., provided as input to the system or determined through a hyperparameter sweep using conventional hyperparameter search techniques.

The system also updates the historical performance data using the quality measure and the current overshoot for the encoded video. For example, the system can update the respective exponential moving averages to incorporate the current quality measure and data measure, i.e., by interpolating between the historical quantity and the corresponding current quantity in accordance with an interpolation weight, e.g., 0.9, 0.95, or 0.85.

The system determines an update to the model parameter values of the rate control neural network using the reward value (step 412), e.g., by computing a gradient of an objective function that includes one or more terms corresponding to the reinforcement learning technique and, optionally, a respective term corresponding to each of the auxiliary tasks described above.

As described above, any appropriate reinforcement learning algorithm and corresponding objective function can be used to encourage the rate control neural network to generate QP decisions that result in higher reward values.

For example, when the MuZero training scheme described above is used, at every step in the training, the system can uniformly sample a batch of states, i.e., a batch of states at which a corresponding frame is being encoded, from an experience replay buffer that stores the results of encoding a certain number of most recent videos. For each state, the system can also sample a specified number, e.g., five, of subsequent actions, i.e., the specified number of subsequent QP decisions, and the necessary labels (the corresponding rewards, the results of the look ahead search, and, when used, the corresponding ground truth auxiliary task outputs). The system then uses the representation network to generate the embedding of the state, and the dynamics network is unrolled five times to generate the subsequent embeddings. The policy, value, and auxiliary network heads then output the predictions for policy, value, and auxiliary metrics for the current and the subsequent states. When the certain number of subsequent actions is five and the value and auxiliary heads each generate an output that approximates a distribution, one example of an objective function that can be used can satisfy, for each sampled state:

$$\frac{1}{a}\sum\nolimits_{t=0}^{5} L_{CE}(\pi_t, \hat{\pi}_t) + b L_{IQN}(v_t, \hat{v}_t) + c \sum\nolimits_{Auxiliary} L_{QR}(y_t, \hat{y}_t)$$

where a is a positive constant, e.g., 6, b is another positive constant, e.g., 0.5, c is another positive constant, e.g., 0.1, t ranges from t=0, the sampled state, to t=5, the last subsequent state, $L_{CE}(\pi_t, \hat{\pi}_t)$ is the cross-entropy loss between (i) the policy output $\pi_t$ generated by the look-ahead search during encoding of the video to which the state belongs and (ii) the policy output $\hat{\pi}_t$ generated by the policy head by processing the state representation for state t, $L_{IQN}(v_t, \hat{v}_t)$ is an IQN loss between the reward $v_t$ for the video to which the state t belongs and the value prediction $\hat{v}_t$ generated by the value head, $\Sigma_{Auxiliary}$ is a sum over the auxiliary tasks that are being used and $L_{QR}(y_t, \hat{y}_t)$ is the quantile regression loss between the ground truth output $y_t$ for a corresponding auxiliary task for state t and the predicted output $\hat{y}_t$ for the corresponding auxiliary task for state t.

Optionally, the objective function can also include a regularization term, e.g., an L2-Regularization term, that is added to the other terms in the objective function. For example, the L2-Regularization term can satisfy $$10^{-3}\|\theta\|_2^2$$

where $\theta$ are the parameters of the neural networks that are being trained.

When a different reinforcement technique is being used, e.g., one that does not use a look-ahead search when generating training data, the objective function can include, e.g., a policy gradient based loss derived from the policy outputs, the rewards, and optionally, the value predictions, and, further optionally, respective terms for each auxiliary task as described above.

As described above, training a neural network as described in this specification results in improved reconstruction quality relative to conventional schemes for determining QP values. As a particular example, Table 1 shows, for two variants of the described techniques, the BD-rate (Bjontegaard-delta rate) difference for three different quality metrics (Mean PSNR, Mean SSIM, and Mean VMAF) relative to using the conventional libvpx QP determinations. Given the bitrate v.s. PSNR curves of two policies, BD-rate computes the average bitrate difference for the same PSNR across the overlapped PSNR range, and therefore, measures the average bitrate reduction for encoding videos at the same quality. Here MuZero-RC refers to a system according to the present disclosure using look-ahead for five subsequent actions, and in which, in the case of an encoding which has a negative overshoot, the reward value is calculated based on the value of PSNR without taking the overshoot into account. "Augmented MuZero-RC" is a variant of this in which, in the case of an encoding which has a negative overshoot, the reward is calculated based on the value of PSNR minus the product of 0.005 and the overshoot, i.e., the technique described above that uses lambda when computing the reward, so that the agent is encouraged to reduce the overshoot even when it is not possible to improve PSNR.

TABLE 1

| Agent | Mean PSNR BD-rate difference | Mean SSIM BD-rate difference | Mean VMAF BD-rate difference |
|---|---|---|---|
| MuZero-RC | −4.72% ± 0.32% | −3.68% ± 0.33% | −0.53% ± 0.21% |
| Augmented MuZero-RC | −6.28% ± 0.19% | −5.11% ± 0.24% | −1.88% ± 0.12% |

Additionally, as can be seen from Table 2 below, using the described techniques results in overshooting the target bit rate significantly less frequently than the conventional libvpx QP determinations.

TABLE 2

| Agent | Fraction of videos with | | |
|---|---|---|---|
| | overshoot > 0 | overshoot > 5% of target | bitrate within 5% of target |
| libvpx | 64.00% | 6.13% | 71.34% |
| MuZero-RC | 20.34% ± 2.16% | 2.04% ± 0.20% | 84.14% ± 0.68% |
| Augmented MuZero-RC | 16.10% ± 2.06% | 2.25% ± 0.15% | 70.12% ± 1.15% |

16

Thus, the described techniques result in both better reconstruction quality and better data efficiency when encoding and reconstructing videos.

This is further evidenced in FIG. 5 and FIG. 6.

FIG. 5 shows histograms 502, 504, and 506 of overshoots achieved by the described techniques relative to the libvpx technique. As can be seen from the histograms 502, 504, and 506, the described techniques overshoot significantly less frequently than the libvpx technique, both overall and for individual target bitrates. Although not shown in FIG. 5, the same effect has been found for other, higher target bitrates, e.g., 384, 448, 512 and 576 Kbps.

FIG. 6 shows histograms 602, 604, and 606 of BD-rate differences of the described techniques relative to the libvpx technique. As can be seen from the histograms 504, 504, and 506, the described techniques achieve better performance given the same target bitrate for a variety of video quality measures.

Figure 7:
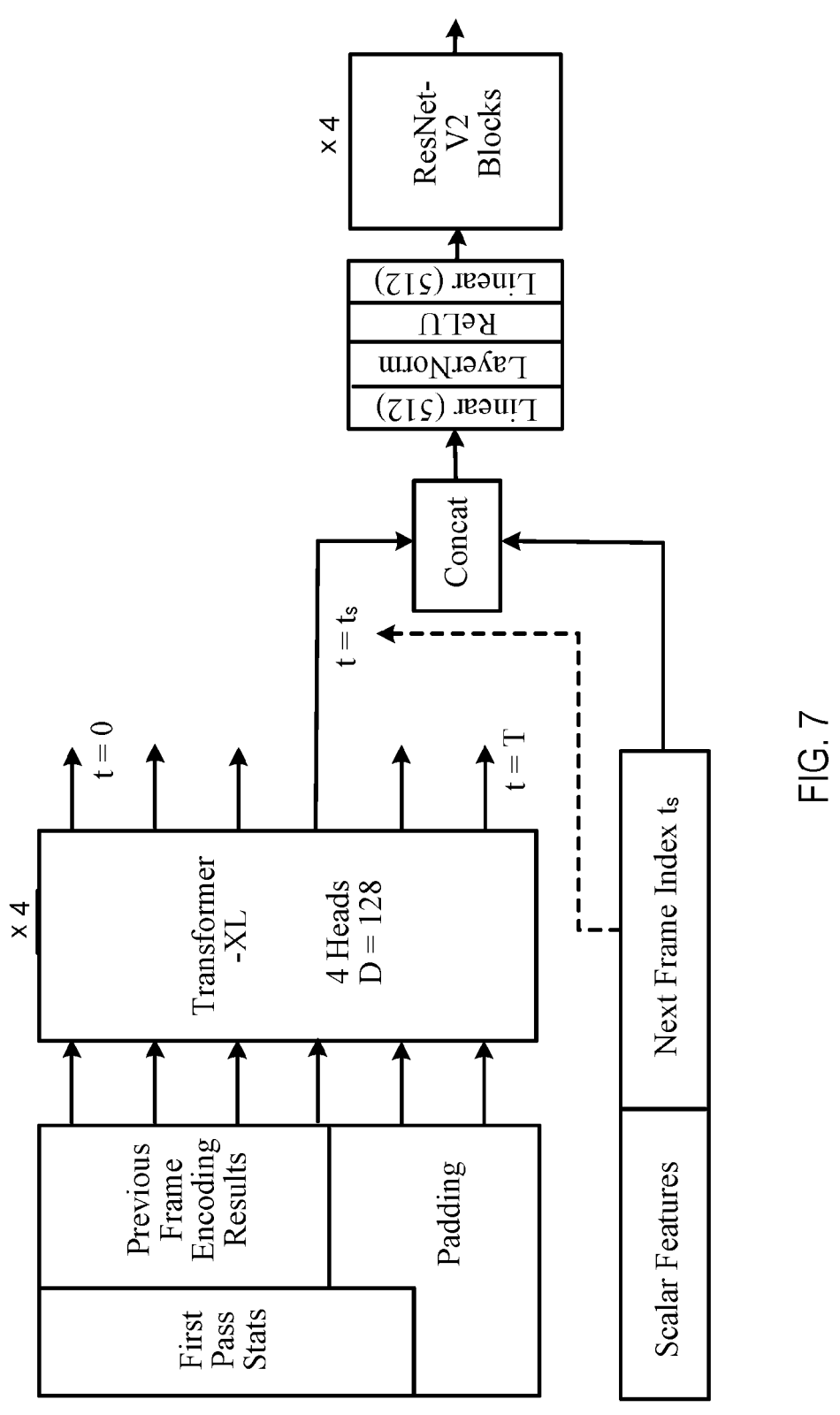
FIG. 7 shows a more detailed example architecture of the representation neural network.

FIG. 7 shows a more detailed example architecture of the representation neural network.

This network takes the features provided by the environment as the input and produces an embedding of the current state as the output. This is also referred to as the "feature representation" above. For any state, the encoding environment generates the following observations:

1. A sequence of first-pass statistics for all the show frames in the video. For example, the system can use the some or all of the first pass statistics and features normalization methods used by H. Mao, C. Gu, M. Wang, A. Chen, N. Lazic, N. Levine, D. Pang, R. Claus, M. Hechtman, C.-H. Chiang, C. Chen, and J. Han. Neural rate control for video encoding using imitation learning, 2020, arXiv:2012.05339.

2. A sequence of PSNR, number of used bits, and applied QPs for all the previously encoded frames in the video so far, along with indices of those frames.

3. The index and the type of the frame to be encoded next. The type can be one of five frame types from the SimpleEncode API.

4. The duration of the video.

5. Target bitrate for the encoding.

Additionally, the system can generate the fraction of the target bitrate used so far in the encoding using the bits used by previously encoded frames and video duration. The system can use this fraction as an additional scalar feature.

The representation network aligns the first two sequential features along the indices of the frames and concatenates the aligned sequences along the feature dimension. This concatenated sequence is then processed using a series of 4 Transformer-XL encoder blocks [Dai et al., 2019]. From this sequence, the entry at index of the frame to be encoded next is extracted. This entry is concatenated with the remaining scalar features and processed using two feedforward layers with intermediate layer normalization [Ba et al., 2016]. The network processes the output of these layers with a series of 4 layer normalized ResNet-V2 blocks [He et al., 2016]. The output of these blocks is the embedding ("feature representation") of the state. The system can use an embedding of, e.g., 512 units. All the layers use ReLU as the activation function.

Figure 8:
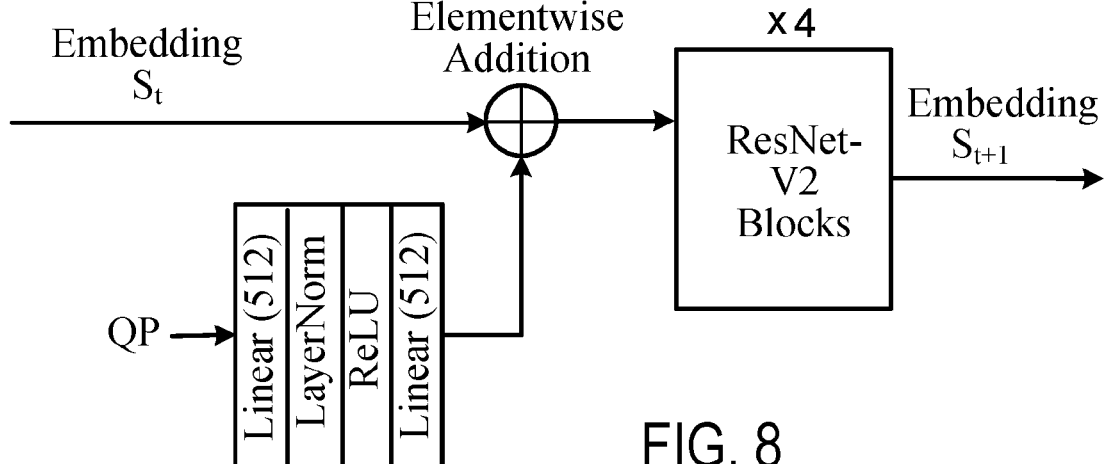
FIG. 8 shows a more detailed example architecture of the dynamics neural network.

FIG. 8 shows a more detailed example architecture of the dynamics neural network.

As shown in FIG. 8, the network takes an embedding of the state and the QP to be applied in that state as the input. It produces an embedding of the next state reached after applying the QP as output. This network processes the QP using two feedforward layers with intermediate layer normalization to output a vector with same dimension as the embedding of the previous state. It performs elementwise addition of this vector and the embedding of the previous state, and processes the result with a series of 4 layer normalized ResNet-V2 blocks. The output of these blocks is the embedding of the next state reached after applying the QP. All the layers use ReLU as the activation function.

Figure 9:
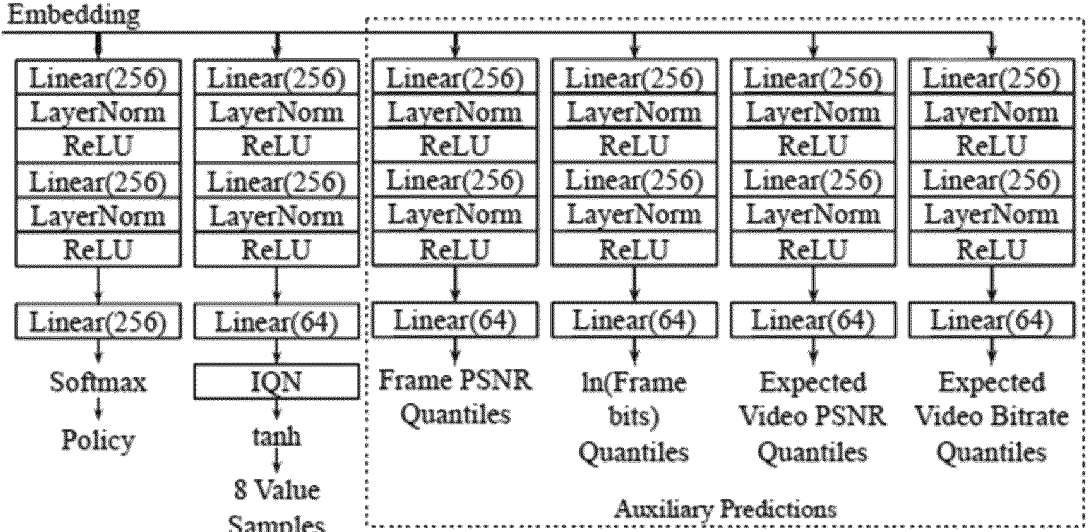
FIG. 9 shows more detailed example architectures of the policy head and a set of auxiliary task heads.

FIG. 9 shows more detailed example architectures of the policy head, the value head, and a set of auxiliary task heads.

As shown in FIG. 9 the neural network takes the embedding of a state and produces the policy, value, and several auxiliary predictions as the output. For the policy prediction, the network processes the state embedding with two feedforward layers with 256 hidden units and layer normalization followed by a linear layer of 256 units representing the logits for each QP value. A softmax function is applied to these logits to produce the policy output. For the value prediction, the network processes the state embedding with two feedforward layers with 256 hidden units and layer normalization followed by a linear layer of 64 units. The output of this layer is used as an embedding for the IQN layer which 545 produces samples of the value prediction. The network applies the tanh function to these samples to limit them 546 in range (−1, 1) as the value in the self-competition based reward mechanism is limited to [−1, 1]. At training time, the system draw 8 samples from the IQN layer to match the self-competition reward. At inference time, when the look ahead search is used, the system can use the expected value instead of sampling.

For each of the auxiliary predictions, the network processes the state embedding with two feedforward layers with 256 hidden units and layer normalization followed by a linear layer of 64 units. The output of this layer represents the uniformly spaced quantiles of the corresponding auxiliary prediction. In the example of FIG. 9, the system predicts the following metrics as auxiliary predictions: 1. The PSNR of the last encoded frame (0 when no frames are encoded), 2. The log of the number of bits used by the last encoded frame (0 when no frames are encoded). The expected PSNR of the video being encoded, 4. The expected bitrate of the video being encoded. Intuitively, these auxiliary predictions help the neural network "understand" the dynamics of the video encoding process, which can improve the final quality of the trained network. All the layers use ReLU as the activation function unless specified otherwise.

A description of an example framework for training the rate control neural network using the MuZero technique follows.

The system can train the neural network (also referred to as "the agent") in an asynchronous distributed actor-learner setting with experience replay, i.e., with multiple actors and optionally multiple learners. The system can maintain a shared buffer across all actors to track agent's EMA-based historical performance for each [video, target bitrate] pair. Each actor processes sample [video, target bitrate] pairs randomly from the training dataset, and generate QPs for encoding them using the latest network parameters and, e.g., 200 simulations of MuZero's MCTS algorithm. The self-competition based reward for the episode is computed as above and the episode is added to the experience replay buffer. The learner process samples transitions from the experience replay buffer to train the networks, and sends the updated parameters to the actor processes at regular intervals.

As a particular example, the system can keep a buffer of the 50,000 latest episodes generated by the actor processes, and draw samples with batch size 512 from the replay buffer to be provided to the learner.

While the above techniques describe applying reinforcement learning to train a neural network to perform rate control, it should be understood that the same techniques can be used to train a neural network to perform a different aspect of the encoding process. For example, the described techniques can be used to train a neural network to perform block partitioning, reference frame selection, or both.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose micro-processors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method of training a rate control neural network for use in encoding sequences of video frames, wherein the rate control neural network is configured to, during encoding of an input sequence of video frames and for each video frame in the sequence, receive input features for the video frame and process the input features to generate a respective score for each of a plurality of possible quantization parameter values, the method comprising, at an iteration which is one of a sequence of iterations of training the rate control neural network:

obtaining a training example comprising a training sequence of video frames and a target data measure for the training sequence;

obtaining a historical performance for the training example, wherein the historical performance is a historical performance of training the rate control neural network on the training example at preceding iterations of the sequence of iterations;

generating an encoded representation of the training sequence that comprises a sequence of encoded video frames, comprising, for each video frame in the training sequence:

generating, using the rate control neural network, a policy output for the video frame that comprises a respective policy score for each of the plurality of possible quantization parameter values;

selecting, using the policy output, a quantization parameter value from the plurality of possible quantization parameter values; and encoding the video frame using a video codec in accordance with the selected quantization parameter value;

determining a current performance for the training example, comprising determining (i) a quality measure that measures a quality of the encoded representation and (ii) a data measure that measures an amount of data required to represent the encoded representation;

generating a reward value from the current performance and the historical performance; and training the rate control neural network using the reward value through reinforcement learning.

2. The method of claim 1, wherein generating, using the rate control neural network, a policy output for the video frame that comprises a respective policy score for each of the plurality of possible quantization parameter values, comprises:

processing input features for the video frame using the rate control neural network to generate a respective score for each of the plurality of possible quantization parameter values; and using the respective scores as the respective policy scores.

3. The method of claim 1, wherein generating, using the rate control neural network, a policy output for the video frame that comprises a respective policy score for each of the plurality of possible quantization parameter values, comprises:

performing a look-ahead search of possible future states of the encoding guided by the rate control neural network.

4. The method of claim 1, wherein the historical performance for the training example is generated from (i) an exponential moving average of previous quality measures computed for the training example during the training of the rate control neural network and (ii) an exponential moving average of previous overshoots determined from the target data measure and previous data measures computed for the training example during the training of the rate control neural network.

5. The method of claim 4, further comprising:

updating the historical performance using (i) the quality measure that measures a quality of the encoded representation and (ii) an overshoot for the data measure that measures a difference between an amount of data required to represent the encoded representation and the target data measure.

6. The method of claim 4, wherein generating a reward value from the current performance and the historical performance comprises:

determining whether either a current overshoot or the exponential moving average of previous overshoots are greater than zero;

when either a current overshoot or the exponential moving average of previous overshoots are greater than zero:

setting the reward value to a positive value if the current overshoot is less than or equal to the exponential moving average of previous overshoots, and setting the reward value to a negative value if the current overshoot is greater than the exponential moving average of previous overshoots.

7. The method of claim 6, wherein generating a reward value from the current performance and the historical performance comprises:

when neither the current overshoot nor exponential moving average of previous overshoots are greater than zero:

setting the reward equal to the positive value if the quality measure that measures a quality of the encoded representation is the same as or better than the exponential moving average of previous quality measures, and setting the reward value to the negative value if the quality measure that measures a quality of the encoded representation is worse than the exponential moving average of previous quality measures.

8. The method of claim 1, wherein generating a reward value from the current performance and the historical performance comprises:

setting the reward value to a positive value when a current performance measure is greater than a historical performance measure by more than a first threshold amount.

9. The method of claim 8, wherein generating a reward value from the current performance and the historical performance comprises:

setting the reward value to a negative value when the current performance measure is less than the historical performance measure by more than the first threshold amount.

10. The method of claim 1, wherein the rate control neural network comprises:

a representation neural network that is configured to process the input features to generate a feature representation for the video frame; and a policy neural network head that is configured to process the feature representation to generate the respective score for each of the plurality of possible quantization parameter values.

11. The method of claim 10, further comprising, for each of one or more auxiliary tasks:

processing the feature representation for the video frame using a corresponding auxiliary neural network head to generate a predicted output for the auxiliary task; and determining a respective error between the predicted output and a corresponding ground truth output for the auxiliary task;

wherein training the rate control neural network using the reward value through reinforcement learning comprises training the rate control neural network using the respective errors for the one or more auxiliary tasks.

12. A system comprising one or more computers and one or more storage devices storing instructions that when executed by the one or more computers cause the one or more computers to perform operations for training a rate control neural network for use in encoding sequences of video frames, wherein the rate control neural network is configured to, during encoding of an input sequence of video frames and for each video frame in the sequence, receive input features for the video frame and process the input features to generate a respective score for each of a plurality of possible quantization parameter values, the operations comprising, at an iteration which is one of a sequence of iterations of training the rate control neural network:

obtaining a training example comprising a training sequence of video frames and a target data measure for the training sequence;

obtaining a historical performance for the training example, wherein the historical performance is a historical performance of training the rate control neural network on the training example at preceding iterations of the sequence of iterations;

generating an encoded representation of the training sequence that comprises a sequence of encoded video frames, comprising, for each video frame in the training sequence:

generating, using the rate control neural network, a policy output for the video frame that comprises a respective policy score for each of the plurality of possible quantization parameter values;

selecting, using the policy output, a quantization parameter value from the plurality of possible quantization parameter values; and encoding the video frame using a video codec in accordance with the selected quantization parameter value;

determining a current performance for the training example, comprising determining (i) a quality measure that measures a quality of the encoded representation and (ii) a data measure that measures an amount of data required to represent the encoded representation;

generating a reward value from the current performance and the historical performance; and training the rate control neural network using the reward value through reinforcement learning.

13. The system of claim 12, wherein generating, using the rate control neural network, a policy output for the video frame that comprises a respective policy score for each of the plurality of possible quantization parameter values, comprises:

processing input features for the video frame using the rate control neural network to generate a respective score for each of the plurality of possible quantization parameter values; and using the respective scores as the respective policy scores.

14. The system of claim 12, wherein generating, using the rate control neural network, a policy output for the video frame that comprises a respective policy score for each of the plurality of possible quantization parameter values, comprises:

performing a look-ahead search of possible future states of the encoding guided by the rate control neural network.

15. The system of claim 12, wherein the historical performance for the training example is generated from (i) an exponential moving average of previous quality measures computed for the training example during the training of the rate control neural network and (ii) an exponential moving average of previous overshoots determined from the target data measure and previous data measures computed for the training example during the training of the rate control neural network.

16. The system of claim 15, the operations further comprising:

updating the historical performance using (i) the quality measure that measures a quality of the encoded representation and (ii) an overshoot for the data measure that measures a difference between an amount of data required to represent the encoded representation and the target data measure.

17. The system of claim 12, the operations further comprising, for each of one or more auxiliary tasks:

processing the feature representation for the video frame using a corresponding auxiliary neural network head to generate a predicted output for the auxiliary task; and determining a respective error between the predicted output and a corresponding ground truth output for the auxiliary task;

wherein training the rate control neural network using the reward value through reinforcement learning comprises training the rate control neural network using the respective errors for the one or more auxiliary tasks.

18. One or more computer-readable storage media storing instructions that when executed by one or more computers cause the one or more computers to perform operations for training a rate control neural network for use in encoding sequences of video frames, wherein the rate control neural network is configured to, during encoding of an input sequence of video frames and for each video frame in the sequence, receive input features for the video frame and process the input features to generate a respective score for each of a plurality of possible quantization parameter values, the method comprising, at an iteration which is one of a sequence of iterations of training the rate control neural network:

obtaining a training example comprising a training sequence of video frames and a target data measure for the training sequence;

obtaining a historical performance for the training example, wherein the historical performance is a historical performance of training the rate control neural network on the training example at preceding iterations of the sequence of iterations;

generating an encoded representation of the training sequence that comprises a sequence of encoded video frames, comprising, for each video frame in the training sequence:

generating, using the rate control neural network, a policy output for the video frame that comprises a respective policy score for each of the plurality of possible quantization parameter values;

selecting, using the policy output, a quantization parameter value from the plurality of possible quantization parameter values; and encoding the video frame using a video codec in accordance with the selected quantization parameter value;

determining a current performance for the training example, comprising determining (i) a quality measure that measures a quality of the encoded representation and (ii) a data measure that measures an amount of data required to represent the encoded representation;

generating a reward value from the current performance and the historical performance; and training the rate control neural network using the reward value through reinforcement learning.

\* \* \* \* \*